US012737615B2

(12) United States Patent
Kim

(10) Patent No.: US 12,737,615 B2
(45) Date of Patent: Sep. 15, 2026

(54) METHOD AND APPARATUS FOR OPTIMIZING BATCH SIZE FOR ARTIFICIAL NEURAL NETWORK ACCELERATOR

(71) Applicant: ELECTRONICS AND TELECOMMUNICATIONS RESEARCH INSTITUTE, Daejeon (KR)

(72) Inventor: Hyun Mi Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1117 days.

(21) Appl. No.: 17/544,688

(22) Filed: Dec. 7, 2021

(65) Prior Publication Data

US 2022/0180192 A1 Jun. 9, 2022

(51) Int. Cl.

*G06N 3/08* (2023.01)
*G06F 9/50* (2006.01)
*G06F 18/21* (2023.01)

(52) U.S. Cl.

CPC ............. *G06N 3/08* (2013.01); *G06F 9/5027* (2013.01); *G06F 18/217* (2023.01)

(58) Field of Classification Search

CPC ........ G06N 3/08; G06N 3/063; G06F 9/5027; G06F 18/217; G06V 10/94; G06V 10/82
See application file for complete search history.

(56) References Cited

U.S. PATENT DOCUMENTS 9,842,293 B2 12/2017 Young
10,083,395 B2 9/2018 Young
11,049,006 B2 6/2021 Langford et al.
2016/0342890 A1 11/2016 Young
2018/0150745 A1* 5/2018 Shirahata ................ G06N 3/08
2019/0079801 A1 3/2019 Lyuh et al.
2019/0122107 A1 4/2019 Young
2020/0151568 A1 5/2020 Lee et al.
2020/0226458 A1* 7/2020 de Vangel .............. G06N 3/063
2020/0372013 A1 11/2020 Lee et al.
2020/0372343 A1 11/2020 Mikami
2021/0224654 A1 7/2021 Young

FOREIGN PATENT DOCUMENTS

CN 104035751 A * 9/2014 ............ G06N 3/045
JP 2020-42591 A 3/2020
JP 2020-42753 A 3/2020
KR 10-2019-0054449 A 5/2019
KR 10-2020-0045017 A 4/2020
KR 102103644 B1 4/2020
KR 102106144 B1 4/2020
KR 10-2020-0134944 A 12/2020

OTHER PUBLICATIONS

Machine Translation of CN104035751 (Year: 2014).*

* cited by examiner

*Primary Examiner* — Ann J Lo

(57) ABSTRACT

A method for optimizing a batch size for an artificial neural network accelerator that processes at least one batch in an apparatus for optimizing a batch size is provided. The method for optimizing a batch size includes: receiving information from an artificial neural network to determine a batch size; and determining the batch size for optimizing basic performance of the artificial neural network according to the artificial neural network.

9 Claims, 7 Drawing Sheets

FIG. 2

METHOD AND APPARATUS FOR OPTIMIZING BATCH SIZE FOR ARTIFICIAL NEURAL NETWORK ACCELERATOR

CROSS-REFERENCE TO RELATED APPLICATION

This application claims priority to and the benefit of Korean Patent Application Nos. 10-2020-0170361 and 10-2021-0142514 filed in the Korean Intellectual Property Office on Dec. 8, 2020 and Oct. 25, 2021, the entire contents of which are incorporated herein by reference.

BACKGROUND OF THE INVENTION

(a) Field of the Invention

The present invention relates to a method and apparatus for optimizing a batch size for an artificial neural network accelerator, and more particularly, to a method and apparatus for optimizing a batch size for an artificial neural network accelerator to maximize the processing performance of the artificial neural network accelerator for various artificial neural networks.

(b) Description of the Related Art

As computing paradigms move from the central processing unit (CPU) to a graphics processing unit (GPU) and back to the neural network processing unit (NPU), which is a neural network accelerator for artificial neural network processing, dedicated compiler technology is essential for efficient operation of the processor. One of the core functions of the compiler is to optimize the performance by considering the characteristics of the hardware. In this case, throughput is the most important factor in measuring performance.

An artificial neural network may include an input layer, an output layer, and several hidden layers. In addition, the neural network consists of a plurality of inputs, and the neural network is configured such that the plurality of inputs pass through the several layers to generate a plurality of outputs corresponding to the plurality of inputs.

In general, in the case of a processor processing a neural network, a sequential method of processing a next input after completing entire neural network processing for one input is adopted. Therefore, performance optimization for one batch process has been the main goal of the compiler.

SUMMARY OF THE INVENTION

The present invention has been made in an effort to provide a method and apparatus for optimizing a batch size for an artificial neural network accelerator capable of optimizing the batch size to have optimal performance for an input artificial neural network in an artificial neural network accelerator that can process a plurality of inputs.

According to an embodiment, a method for optimizing a batch size for an artificial neural network accelerator that processes at least one batch in an apparatus for optimizing a batch size is provided. The method for optimizing a batch size includes receiving information from an artificial neural network to determine a batch size, and determining the batch size for optimizing basic performance of the artificial neural network according to the artificial neural network.

The determining of the batch size may include determining one batch size for the artificial neural network.

The determining of one batch size for the artificial neural network may include: optimizing the basic performance for the neural network based on each batch size; and determining a batch size having the best basic performance as the one batch size of the artificial neural network.

The determining of the batch size may include determining a different batch size for each layer of the artificial neural network.

The determining of a different batch size for each layer may include: optimizing the basic performance of the artificial neural network based on each batch size for each layer; and determining a batch size having the best basic performance for each layer as the batch size of the layer.

The method for optimizing a batch size may further include outputting the determined batch size to the artificial neural network accelerator.

According to another embodiment, an apparatus for optimizing a batch size for an artificial neural network accelerator that processes at least one batch is provided. The apparatus for optimizing a batch size includes: an input interface that receives information from an artificial neural network to determine a batch size; a processor that determines the batch size of the artificial neural network through the process of optimizing the performance of the artificial neural network; and an output interface that transmits the determined batch size to the artificial neural network accelerator.

The processor may optimize basic performance for the artificial neural network based on each batch size, and determines a batch size having the best basic performance as the batch size of the artificial neural network.

The processor may determine a different batch size for each layer of the artificial neural network.

The processor may optimize basic performance for the artificial neural network based on each batch size for each layer, and determines a batch size having the best basic performance for each layer as the batch size of the layer.

BRIEF DESCRIPTION OF THE DRAWINGS

FIG. 2 is a diagram illustrating programming registers and operation registers for layout of 4-dimensional data according to an embodiment.

DETAILED DESCRIPTION OF THE EMBODIMENTS

Figure 1:
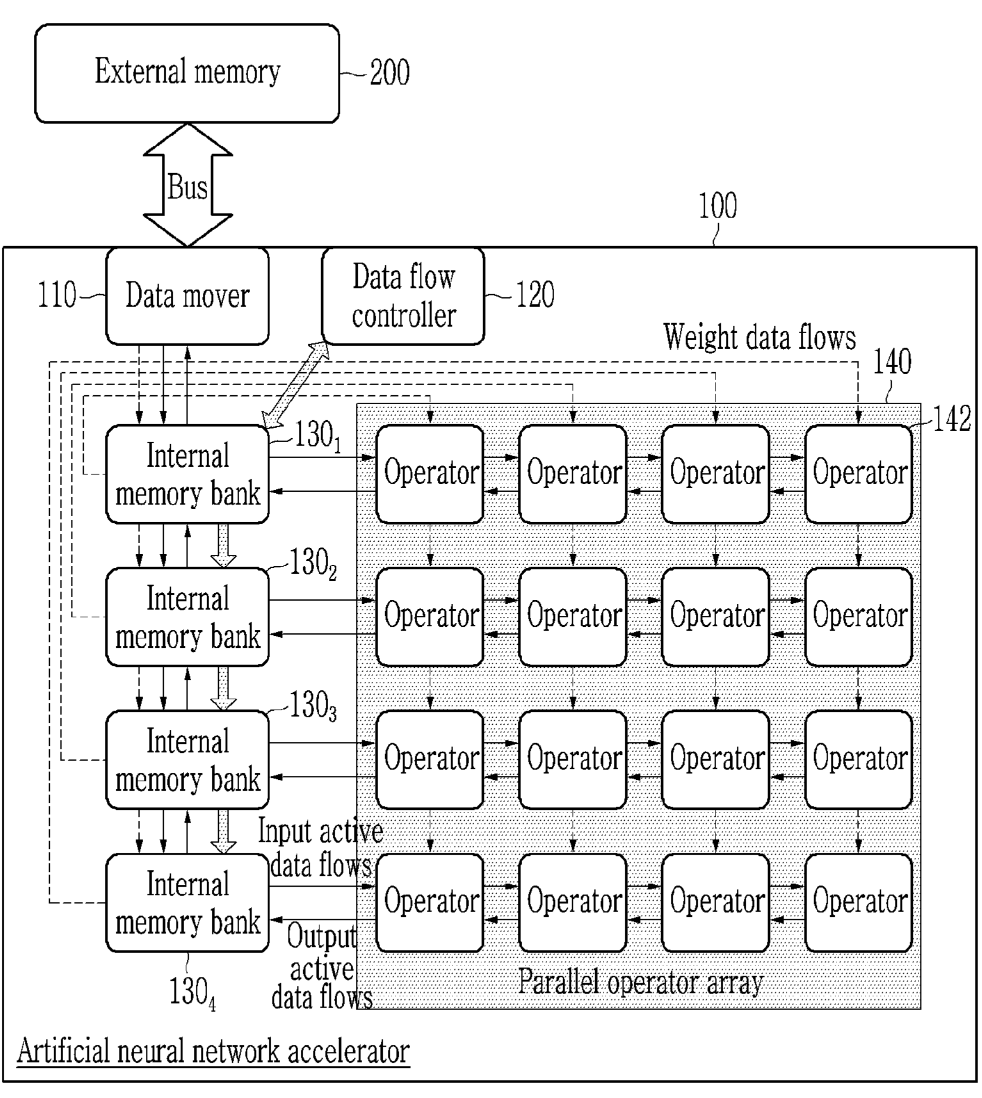
FIG. 1 is a diagram illustrating an artificial neural network accelerator according to an embodiment.

Hereinafter, embodiments of the present invention will be described in detail with reference to the attached drawings so that a person of ordinary skill in the art may easily implement the present invention. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, when a part is referred to "include" a certain element, it means that it may further include other elements rather than exclude other elements, unless specifically indicated otherwise.

Now, a method and apparatus for optimizing a batch size for an artificial neural network accelerator according to an embodiment will be described in detail with reference to the drawings.

FIG. 1 is a diagram illustrating an artificial neural network accelerator according to an embodiment.

Referring to FIG. 1, the artificial neural network accelerator 100 includes a data mover 110, a data flow controller 120, a plurality of internal memory banks $\mathbf{130}_1$ to $\mathbf{130}_4$, and a parallel operator 140. In FIG. 1, four internal memory banks $\mathbf{130}_1$ to $\mathbf{130}_4$ are shown.

A plurality of input data is input from various peripheral devices and is stored in the large-capacity external memory 200.

The data mover 110 moves the input data stored in the external memory 200 to the internal memory banks $\mathbf{130}_1$ to $\mathbf{130}_4$ in consideration of the data flow of the artificial neural network accelerator 100 and the type of operations of the neural network layers to be processed. In addition, the data mover 110 moves weight data for neural network processing to the internal memory banks $\mathbf{130}_1$ to $\mathbf{130}_4$.

When data loading into the internal memory banks $\mathbf{130}_1$ to $\mathbf{130}_4$ is completed, in order to supply the input data and weight data to the parallel operator 140, the data flow controller 120 generates control signals to control the flow of input data required by the parallel operator 140, and transmits the control signals to each of the internal memory banks $\mathbf{130}_1$ to $\mathbf{130}_4$ so that the parallel operator 140 can perform operations in parallel.

The parallel operator 140 includes a plurality of operators 142, and the plurality of operators 142 are arranged in row and column directions. Each of the internal memory banks $\mathbf{130}_1$ to $\mathbf{130}_4$ may be located corresponding to each row of the parallel operator 140.

The plurality of operators 142 perform operations on the input data and output operation results. The operation results of the plurality of operators 142 are stored in the internal memory banks $\mathbf{130}_1$ to $\mathbf{130}_4$. At this time, internal memory address values are generated from the data flow controller 120 to help the storage of output data of the plurality of operators 142. When the internal memory banks $\mathbf{130}_1$ to $\mathbf{130}_4$ provide input data to the operators 142 at a specific point in time and store the operation results from the operators 142 back to the internal memory banks $\mathbf{130}_1$ to $\mathbf{130}_4$, in order to store to the correct location in the internal memory banks $\mathbf{130}_1$ to $\mathbf{130}_4$, the internal memory address values are used, and the internal memory address values are generated by the data flow controller 120.

When the data output from the operators 142 is used as inputs of the next operations, it is reused while being stored in the internal memory banks $\mathbf{130}_1$ to $\mathbf{130}_4$. Otherwise, the data stored in the internal memory banks $\mathbf{130}_1$ to $\mathbf{130}_4$ is moved to the external memory 200 through the data mover 110.

In order to support various operations, active data should be variously laid out in the internal memory banks $\mathbf{130}_1$ to $\mathbf{130}_4$ according to the types and parameters of the operations. Active data means input data and output data excluding weight data. When the data mover 110 moves data from the external memory 200 to the internal memory banks $\mathbf{130}_1$ to $\mathbf{130}_4$ and laid out the data, the data mover 110 is configured to be programmable through an internal memory address generator. The data mover 110 is used to move data between the external memory 200 and the internal memory banks $\mathbf{130}_1$ to $\mathbf{130}_4$, and may use the internal memory address values when the data moved from the external memory 200 to the internal memory banks $\mathbf{130}_1$ to $\mathbf{130}_4$ laid out in the internal memory banks $\mathbf{130}_1$ to $\mathbf{130}_4$.

The internal memory address generator may be configured to enable programming for data layout of a total of total 4-dimensional tensor in consideration of a plurality of batches in addition to the 3-dimensional tensor such as image input for active data and weight data. The 3-dimensional tensor is usually composed of a height, a width, and a channel. Data layout of the 4-dimensional tensor considers information about a batch, a channel of the tensor, a height of the tensor, and a width of the tensor. For this, parameters required to be programmed in the internal memory address generator are defined as shown in FIG. 2.

Figure 2:
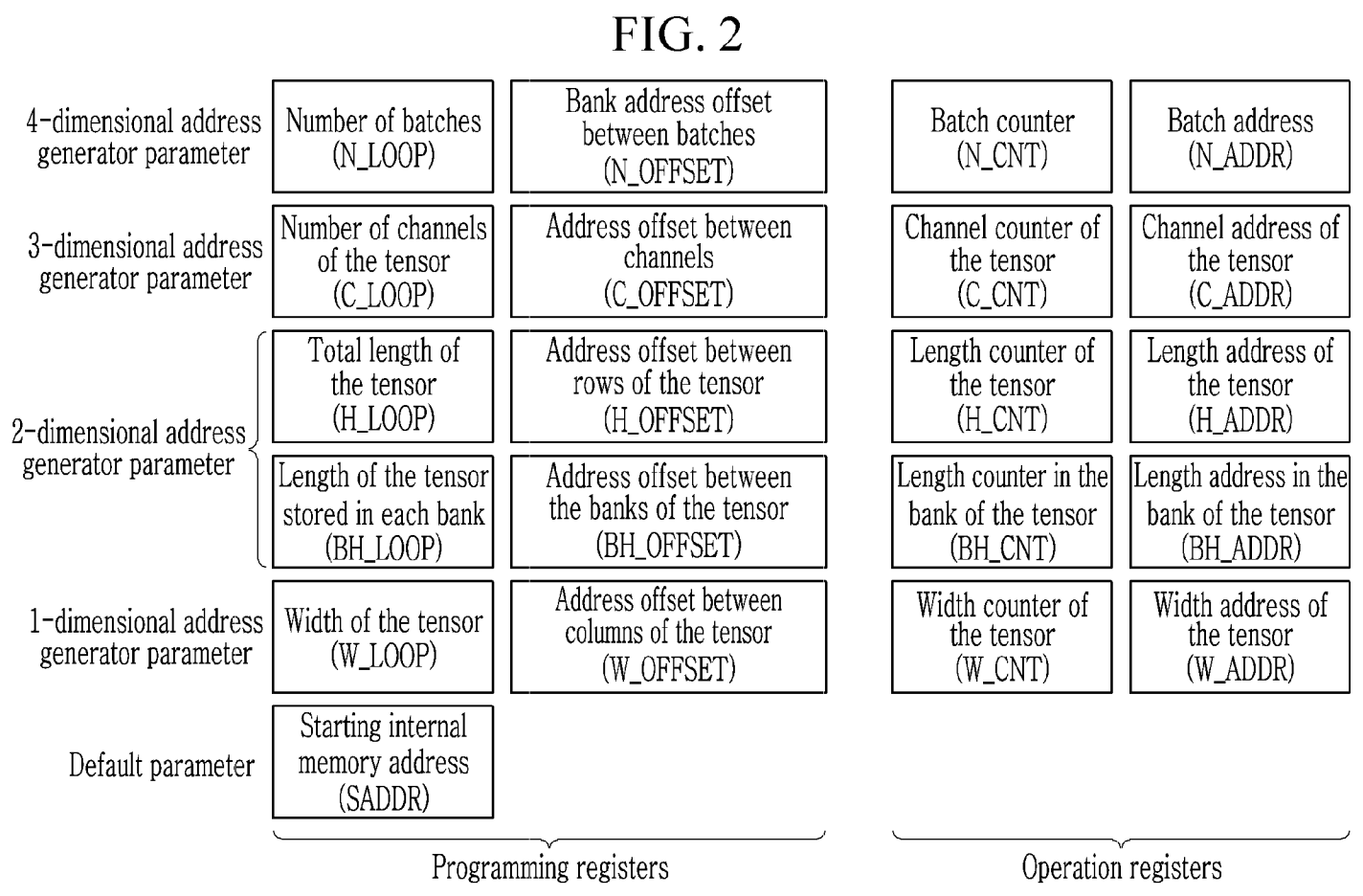

FIG. 2 is a diagram illustrating programming registers and operation registers for layout of 4-dimensional data according to an embodiment.

Referring to FIG. 2, parameters that require programming for data layout of the 4-dimensional tensor are defined as programming registers for a default parameter, a 1-dimensional address generator parameter, a 2-dimensional address generator parameter, a 3-dimensional address generator parameter, and a 4-dimensional address generator parameter. Here, the n-dimensional address generator parameters are parameters required for the n-dimensional address generator, and are parameters to make programmable which pattern to generate the address with when generating the address at each time point in the n-dimensional address generator. n is 1, 2, 3, or 4.

The default parameter includes the starting internal memory address SADDR.

The 1-dimensional address generator parameter includes the width W_LOOP of the tensor and the address offset between columns W_OFFSET of the tensor.

The 2-dimensional address generator parameter includes the total length H_LOOP of the tensor and the address offset between rows H_OFFSET of the tensor. At this time, since the internal memory is divided into banks, the 2-dimensional address generator parameter may further include the length BH_LOOP of the tensor stored in each bank and the address offset between the banks BH_OFFSET of the tensor.

The 3-dimensional address generator parameter includes the number of channels C_LOOP of the tensor and the address offset between channels C_OFFSET.

The 4-dimensional address generator parameter includes the number of batches N_LOOP and the bank address offset between batches N_OFFSET.

These programming registers are combined with the corresponding operation registers to be implemented as the internal memory address generator for data layout of a 4-dimensional tensor.

Figure 3:
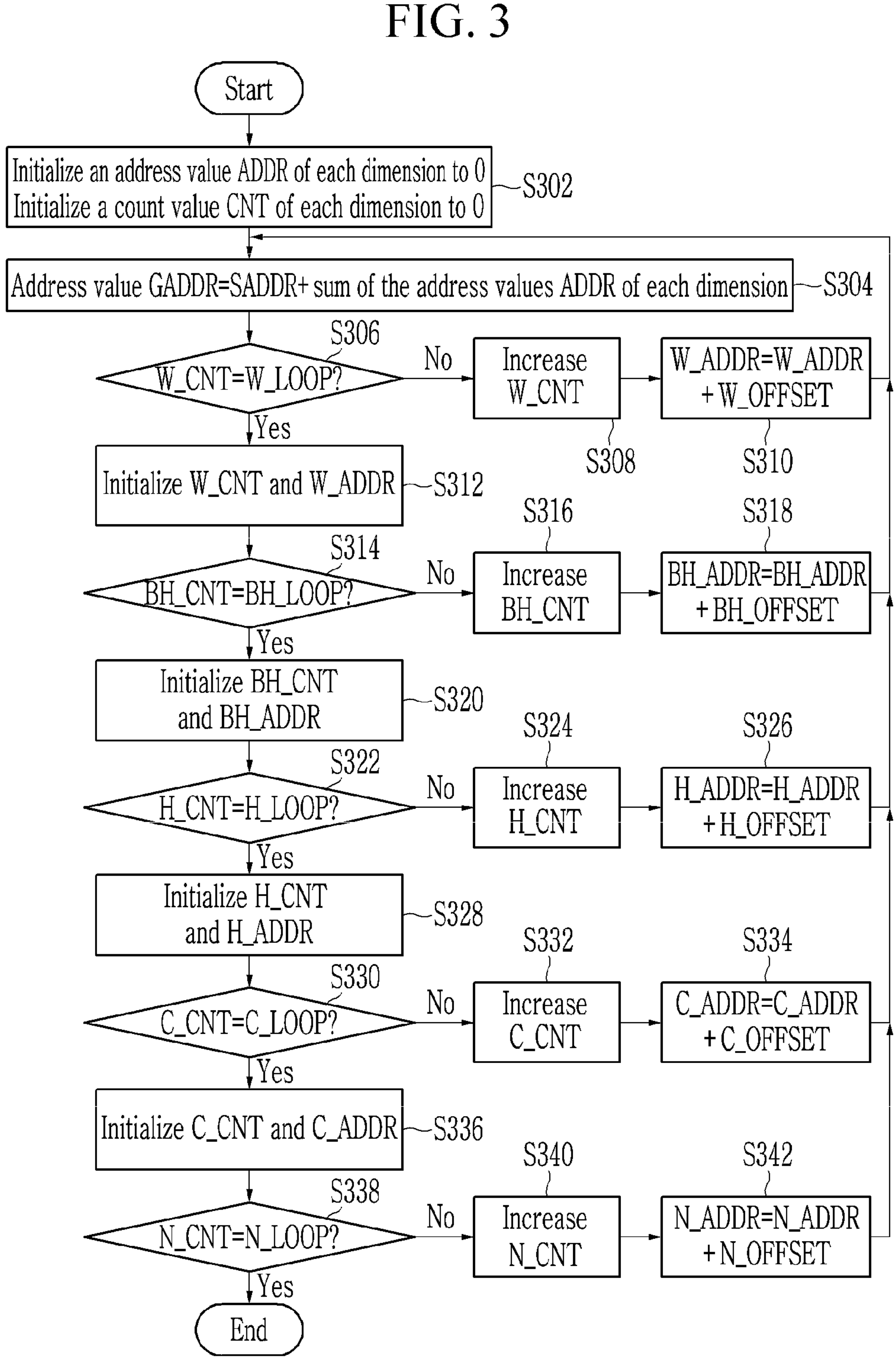
FIG. 3 is a flowchart illustrating a method of generating an internal memory address according to an embodiment.

The internal memory address generator generates internal memory addresses by the process shown in FIG. 3 based on the programming registers and operation registers defined in FIG. 2.

FIG. 3 is a flowchart illustrating a method of generating an internal memory address according to an embodiment.

Referring to FIG. 3, the internal memory address generator initializes the address value ADDR of each dimension to 0, and initializes the count value CNT of each dimension to 0 (S302).

The internal memory address generator generates an address value GADDR by adding the sum of the address values ADDR of each dimension to the start internal memory address value SADDR (S304).

First, when the width counter value W_CNT of the tensor corresponding to 1 dimension is not equal to a predetermined width value W_LOOP of the tensor (S306), the internal memory address generator increases the width counter value W_CNT of the tensor (S308), and calculates a width address value W_ADDR of the tensor by adding the width offset value W_OFFSET of the tensor to the width address value W_ADDR of the current tensor (S310).

The internal memory address generator generates the address value GADDR through step S304 when the width address value W_ADDR of the tensor is calculated.

The internal memory address generator repeats steps S306 to S310 and S304 until the width counter value W_CNT of the tensor becomes equal to the predetermined width value W_LOOP of the tensor.

When the width counter value W_CNT of the tensor becomes equal to the predetermined width value W_LOOP of the tensor (S306), the internal memory address generator initializes the width counter value W_CNT of the tensor and the width address value W_ADDR of the tensor (S312).

Next, the internal memory address generator checks whether the length counter value BH_CNT of the tensor stored in each bank corresponding to the 2-dimension is the same as a predetermined length value in the bank BH_LOOP of the tensor (S314).

When the length counter value BH_CNT of the tensor stored in each bank is not the same as the predetermined length value in the bank BH_LOOP of the tensor (S314), the internal memory address generator increases the length counter value in the bank BH_CNT of the tensor (S316), and calculates the length address value in the bank BH_ADDR of the tensor by adding the address offset value in the bank BH_OFFSET of the tensor to the length address value in the bank BH_ADDR of the current tensor (S318).

The internal memory address generator generates the address value GADDR through step S304 when the length address value in the bank BH_ADDR of the tensor is calculated.

The internal memory address generator repeats steps S314 to S318, S304, S306, and S312 until the length counter value in the bank BH_CNT becomes equal to the predetermined length value in the bank BH_LOOP of the tensor.

When the length counter value in the bank BH_CNT is equal to the predetermined length value in the bank BH_LOOP of the set tensor (S314), the internal memory address generator initializes the length counter value in the bank BH_CNT and the length address value in the bank BH_ADDR of the tensor (S320).

Next, the internal memory address generator checks whether the length counter value H_CNT of the tensor corresponding to 2-dimension is equal to a predetermined total length value H_LOOP of the tensor (S322).

When the length counter value H_CNT of the tensor is not equal to the predetermined total length value H_LOOP (S322), the internal memory address generator increases the length counter value H_CNT of the tensor (S324), and calculates a length address value H_ADDR of the tensor by adding the address offset value between rows H_OFFSET of the tensor to the length address value H_ADDR of the current tensor (S326).

The internal memory address generator generates the address value GADDR through step S304 when the length address value H_ADDR of the tensor is calculated.

The internal memory address generator repeats steps S322-S326, S304, S306, S312, S314, S320, and S322 until the length counter value H_CNT of the tensor becomes equal to the predetermined total length value H_LOOP of the tensor.

When the length counter value H_CNT of the tensor is equal to the predetermined total length value H_LOOP of the tensor (S322), the internal memory address generator initializes the length counter value H_CNT of the tensor and the length address value H_ADDR of the tensor (S328).

Next, the internal memory address generator checks whether the channel counter value C_CNT of the tensor corresponding to 3 dimensions is equal to a predetermined number of channels C_LOOP of the tensor (S330).

When the channel counter value C_CNT of the tensor is not equal to the number of channels C_LOOP of the tensor (S330), the internal memory address generator increases the channel counter value C_CNT of the tensor (S332), and calculates a channel address value C_ADDR of the tensor by adding the address offset value between channels C_OFFSET to the channel address value C_ADDR of the current tensor (S334).

When the channel address value C_ADDR of the tensor is calculated, the internal memory address generator generates the address value GADDR through step S304.

The internal memory address generator repeats steps S330 to S334, S304, S306, S312, S314, S320, S322, and S328 until the channel counter value C_CNT of the tensor becomes equal to the predetermined number of channels C_LOOP of the tensor.

When the channel counter value C_CNT is equal to the predetermined number of channels C_LOOP of the tensor (S330), the internal memory address generator initializes the channel counter value C_CNT of the tensor and the channel address value C_ADDR of the tensor (S336).

Finally, the internal memory address generator checks whether the batch counter value N_CNT corresponding to the 4 dimensions is equal to a predetermined number of batches N_LOOP (S338).

When the batch counter value N_CNT is not equal to the predetermined number of batches N_LOOP, the internal memory address generator increases the batch counter value N_CNT (S340), and calculates a batch address value N_ADDR by adding the bank address offset between batches N_OFFSET to the current batch address value N_ADDR (S342).

When the batch address value N_ADDR is calculated, the internal memory address generator generates the address value GADDR through step S304.

The internal memory address generator repeats steps S338 to S342, S304, S306, S312, S314, S320, S322, S328, S330, and S336 until the batch counter value N_CNT becomes equal to the predetermined number of batches N_LOOP.

When the batch counter value N_CNT becomes equal to the predetermined number of batches N_LOOP (S338), the internal memory address generator ends the process of generating the internal memory address values. At this time, the internal memory address generator may initialize the batch counter value N_CNT and the batch address value N_ADDR.

Based on the configuration of the artificial neural network accelerator 100 in consideration of a plurality of batches in the internal memory banks $\mathbf{130}_1$ to $\mathbf{130}_4$, an optimization algorithm for increasing performance represented by throughput by increasing the utilization of the entire artificial neural network accelerator 100 is provided through a compiler of the apparatus for optimizing a batch size.

The options for the number of batches may be provided with a fixed number of batches set by a user, the one batch number for the entire neural network, and a different number of batches for each layer of the artificial neural network. For each option, the basic optimization process of the compiler is repeatedly executed in the apparatus for optimizing a batch size.

Figure 4:
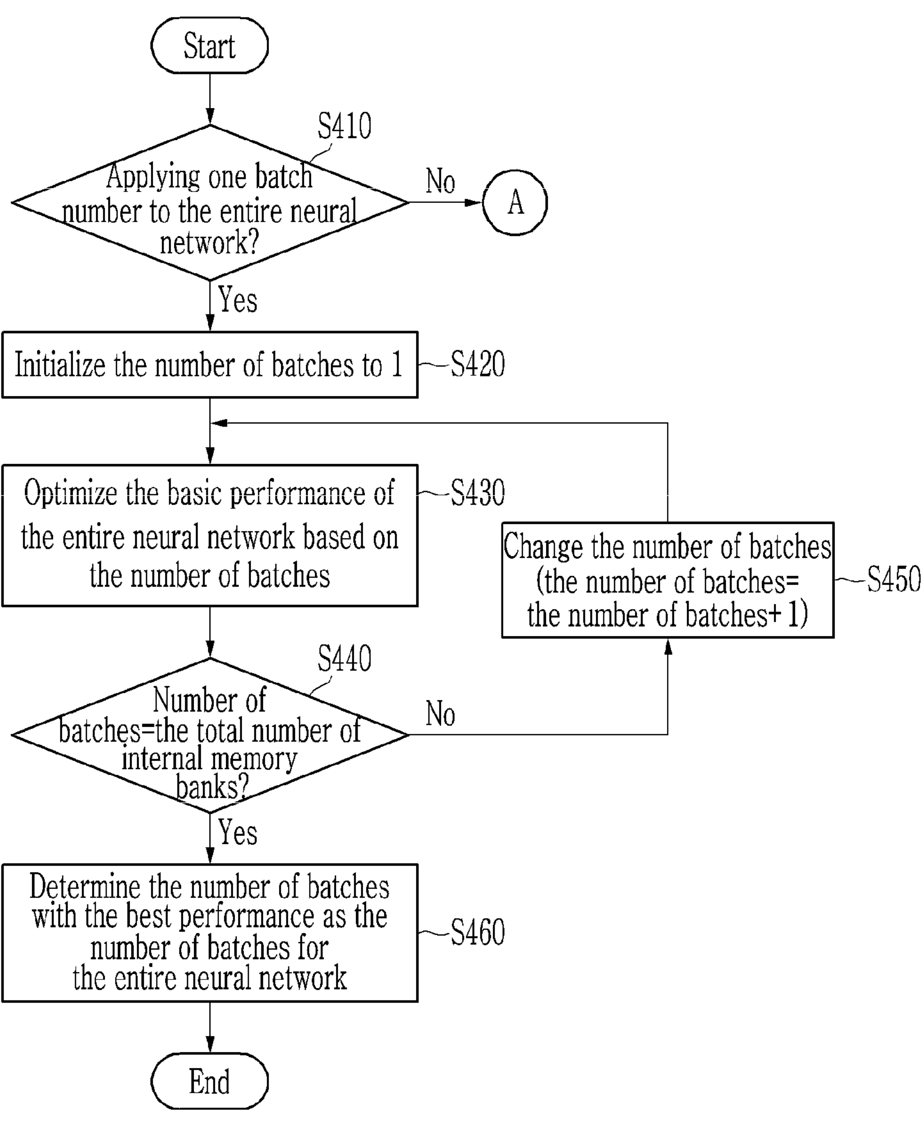
FIG. 4 is a flowchart illustrating a method for optimizing a batch size according to an embodiment.

FIG. 4 is a flowchart illustrating a method for optimizing a batch size according to an embodiment.

Referring to FIG. 4, the apparatus for optimizing a batch size performs a procedure for determining the optimal number of batches to be applied to the entire neural network if the one batch number is to be applied to the entire neural network (S410). The number of batches means a batch size. When one batch number is applied to the entire neural network, a buffering operation of preparing input data to match the number of batches to be applied and storing the output corresponding to the number of batches to be applied is involved.

First, the apparatus for optimizing a batch size initializes the number of batches to 1 (S420).

The apparatus for optimizing a batch size optimizes the basic performance of the entire neural network based on the number of batches (S430). The basic performance may be set as throughput, and may be optimized through the optimization algorithm. The basic optimization process may include internal memory data allocation and hardware operation scheduling decision processes, and a performance prediction model based on artificial neural network accelerator modeling is used in the optimal memory allocation and scheduling decision processes. For example, a search space is defined for a method of allocating data for the optimal use of internal memory and scheduling to drive a hardware module using the method, and the performance prediction model predicts performance in various cases within the search space, and then may select the search space having the best performance.

The apparatus for optimizing a batch size checks whether the number of batches is equal to a predetermined value. Due to the hardware structure, it is not possible to support more than one batch in one memory bank. In addition, even if the hardware supports a plurality of batches in one memory bank, a large amount of batches cannot be stored due to the storage limit of the internal memory. Accordingly, by limiting the maximum number of batches, the number of search spaces can be reduced, which can save time in the optimization process. Therefore, the predetermined value may be set to the total number of internal memory banks. Alternatively, the predetermined value may be set to a different value.

The apparatus for optimizing a batch size checks whether the number of batches is equal to the total number of internal memory banks (S440).

When the number of batches is not equal to the total number of internal memory banks, the apparatus for optimizing a batch size changes the number of batches to a different value (S450) and optimizes the basic performance of the entire neural network based on the changed number of batches (S430). For example, the apparatus for optimizing a batch size may change the number of batches to a value increased by 1.

The apparatus for optimizing a batch size optimizes the basic performance of the entire neural network based on each number of batches while changing the number of batches until the number of batches equals the total number of internal memory banks, and then determines the number of batches with the best performance as the number of batches for the entire neural network (S460).

Figure 5:
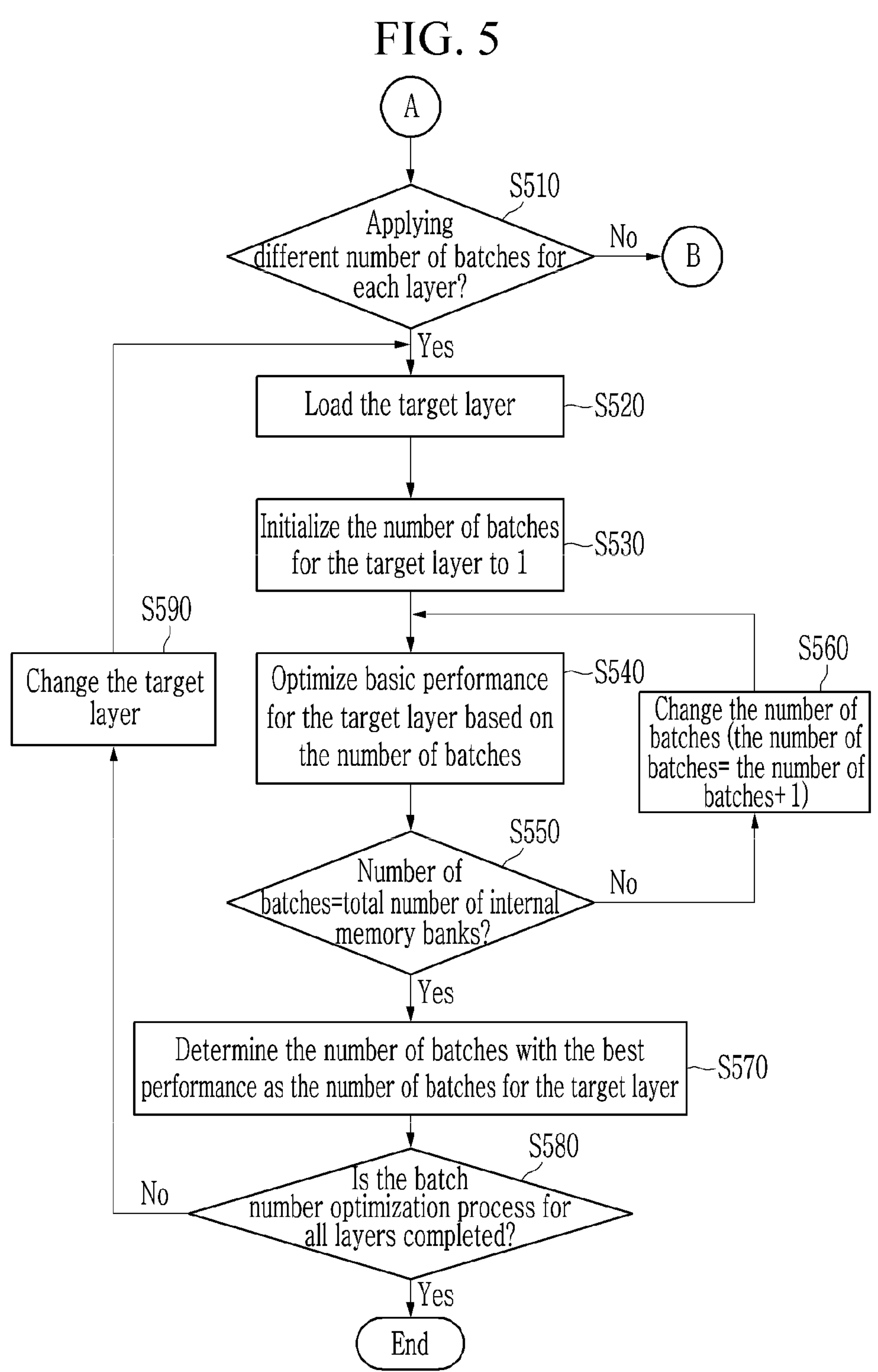
FIG. 5 is a flowchart illustrating a method for optimizing a batch size according to another embodiment.

FIG. 5 is a flowchart illustrating a method for optimizing a batch size according to another embodiment.

Referring to FIG. 5, the apparatus for optimizing a batch size performs a procedure for determining the optimal number of batches to be applied to each layer if a different number of batches for each layer is to be applied to the entire neural network (S510). When a different number of batches for each layer is applied, buffering of input data and output data is performed for each layer.

The apparatus for optimizing a batch size loads the target layer (S520).

The apparatus for optimizing a batch size initializes the number of batches for the target layer to 1 (S530).

The apparatus for optimizing a batch size optimizes basic performance for the target layer based on the number of batches (S540).

The apparatus for optimizing a batch size checks whether the number of batches is equal to the total number of internal memory banks (S550), and when the number of batches is not equal to the total number of internal memory banks, changes the number of batches to a different value (S560), and optimizes the basic performance of the target layer based on the changed number of batches (S540). For example, the apparatus for optimizing a batch size may change the number of batches to a value increased by 1.

The apparatus for optimizing a batch size optimizes the basic performance of the target layer based on each number of batches while changing the number of batches until the number of batches equals the total number of internal memory banks, and then determines the number of batches with the best performance as the number of batches for the target layer (S570).

The apparatus for optimizing a batch size checks whether the batch number optimization process for all layers is completed (S580).

When the batch size optimization process for all layers is not completed (S580), the apparatus for optimizing a batch size changes the target layer to another layer (S590), and repeats steps S520 to S570 to determine the number of batches for other layers.

The apparatus for optimizing a batch size repeats steps S590 and S520 to S570 until the batch number optimization process for all layers is completed to determine the number of batches for all layers, respectively.

Figure 6:
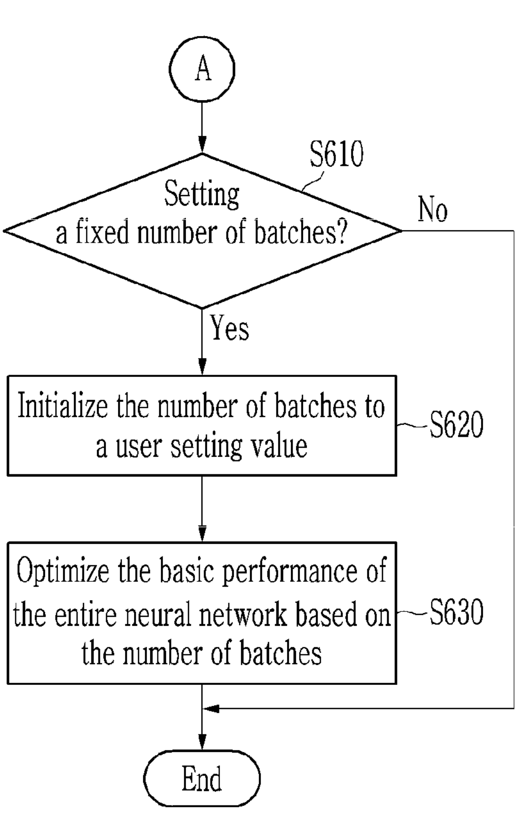
FIG. 6 is a flowchart illustrating a method for optimizing a batch size according to another embodiment.

FIG. 6 is a flowchart illustrating a method for optimizing a batch size according to another embodiment.

Referring to FIG. 6, when a fixed number of batches is to be applied to the entire neural network (S610), the apparatus for optimizing a batch size initializes the number of batches to a user setting value (S620).

Next, the apparatus for optimizing a batch size optimizes the basic performance of the entire neural network based on the number of batches (S630).

Figure 7:
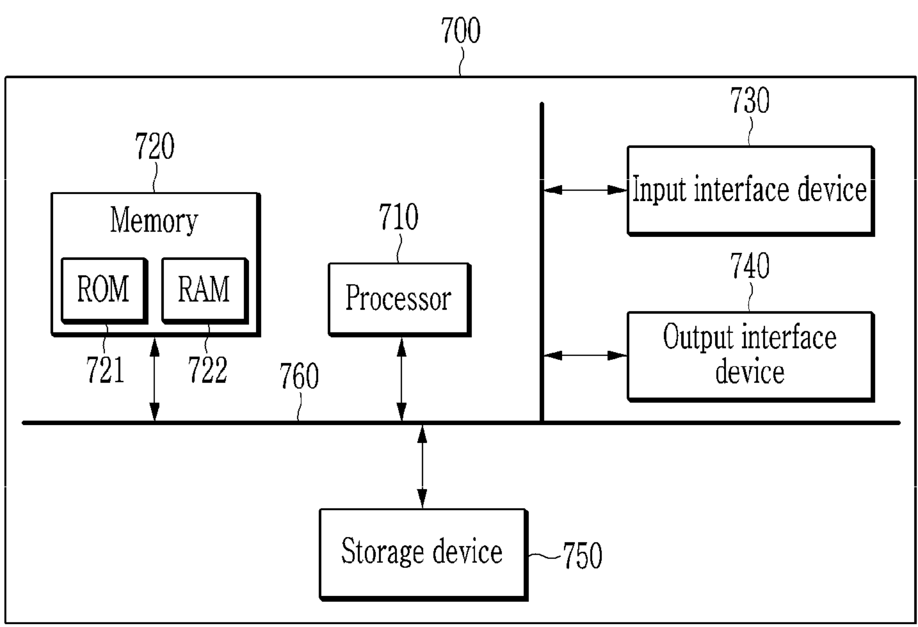
FIG. 7 is a diagram illustrating an apparatus for optimizing a batch size according to an embodiment.

FIG. 7 is a diagram illustrating an apparatus for optimizing a batch size according to an embodiment.

Referring to FIG. 7, the apparatus for optimizing a batch size 700 may represent a computing device in which the method for optimizing a batch size described above is implemented.

The apparatus for optimizing a batch size 700 may include at least one of a processor 710, a memory 720, an input interface device 730, an output interface device 740, and a storage device 750. Each of the components may be connected by a common bus 760 to communicate with each other. In addition, each of the components may be connected through an individual interface or an individual bus centered on the processor 710 instead of the common bus 760.

The processor 710 may be implemented as various types such as an application processor (AP), a central processing unit (CPU), a graphics processing unit (GPU), etc., and may be any semiconductor device that executes a command stored in the memory 720 or the storage device 750. The processor 710 may execute a program command stored in at least one of the memory 720 and the storage device 750. The processor 710 may load program instructions for implementing at least some functions of the method for optimizing a batch size described based on FIGS. 4 to 6 to the memory 720, and may perform the operation described with reference to FIGS. 4 to 6.

The memory 720 and the storage device 750 may include various types of volatile or non-volatile storage media. For example, the memory 720 may include a read-only memory (ROM) 721 and a random access memory (RAM) 722. The memory 720 may be located inside or outside the processor 710, and may be connected to the processor 710 through various known means.

The input interface device 730 is configured to provide data to the processor 710. The input interface device 730 may provide input data and information of an artificial neural network to which a batch size is to be applied to the processor 710. For example, hardware configuration information of the artificial neural network accelerator, such as the size of input data, the structure of the artificial neural network, the internal memory bank structure and internal memory bank size of the artificial neural network accelerator, and the number of operators, may be provided to the processor 710.

The output interface device 740 is configured to output data from the processor 710. The output interface device 740 may output the batch number from the processor 710 to the artificial neural network accelerator 100.

At least some of the method for optimizing a batch size according to an embodiment may be implemented as a program or software executed in a computing device, and the program or software may be stored in a computer-readable medium.

In addition, at some of the method for optimizing a batch size according to an embodiment may be implemented as hardware that can be electrically connected to the computing device.

According to an embodiment, various neural network models can be processed with the most optimal performance through an artificial neural network accelerator capable of processing multiple batches and a batch size optimization algorithm, so that the efficiency of the artificial neural network accelerator can be maximized and automated.

The components described in the example embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the example embodiments may be implemented by software, and the software may be recorded on a recording medium. The components, functions, and processes described in the example embodiments may be implemented by a combination of hardware and software. The method according to embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing, or to control an operation of a data processing apparatus, e.g., by a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network. Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic or magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk and a read only memory (ROM), a random access memory (RAM), a flash memory, an erasable programmable ROM (EPROM), and an electrically erasable programmable ROM (EEPROM), and any other known computer readable media. A processor and a memory may be supplemented by, or integrated into, a special purpose logic circuit. The processor may run an operating system (08) and one or more software applications that run on the OS. The processor device also may access, store, manipulate, process, and create data in response to execution of the software. For purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described example embodiments in all example embodiments, and it should be understood that the above-described program components and apparatuses may be incorporated into a single software product or may be packaged in multiple software products. It should be understood that the embodiments disclosed herein are merely illustrative and are not intended to limit the scope of the invention. It will be apparent to one of ordinary skill in the art that various modifications of the embodiments may be made without departing from the spirit and scope of the claims and their equivalents.

What is claimed is:

1. A method performed by an artificial neural network accelerator, the method comprising:

receiving information via an input interface from an artificial neural network to determine a batch size for batches within internal memory banks of the artificial neural network, wherein the information from the artificial neural network includes information associated with a hardware configuration of the internal memory banks of the artificial neural network;

optimizing a throughput based performance metric of the artificial neural network to determine the batch size for the artificial neural network, by:

determining a plurality of candidate numbers of batches constrained by a total number of the internal memory banks;

evaluating the throughput based performance metric of the artificial neural network for each of the plurality of the candidate numbers of batches;

selecting, as the batch size, a number of batches corresponding to a maximum value of the throughput based performance metric among the plurality of candidate numbers of batches; and performing operations within the artificial neural network accelerator based on the determined batch size in parallel using the internal memory banks.

2. The method of claim 1, wherein the determining of the batch size includes determining one batch size for the entire artificial neural network.

3. The method of claim 1, wherein the determining of the batch size includes determining a different batch size for each layer of the artificial neural network.

4. The method of claim 3, wherein the determining of a different batch size for each layer includes:

optimizing the throughput based performance metric of the artificial neural network based on each batch size for each layer;

determining a batch size having a best throughput maximum value of the throughput based performance metric for each layer as the batch size of the layer.

5. An apparatus, comprising:

an input interface that receives information from an artificial neural network to determine a batch size, wherein the information from the artificial neural network includes information associated with internal memory banks of the artificial neural network, including an internal memory bank structure and an internal memory bank size of the artificial neural network;

a processor optimizes a throughput based performance metric of the artificial neural network to determine the batch size for the artificial neural network, by:

determining a plurality of candidate numbers of batches constrained by a total number of internal memory banks;

evaluating the throughput based performance metric of the artificial neural network for each of the plurality of the candidate numbers of batches;

selecting, as the batch size, a number of batches corresponding to a maximum value of the throughput based performance metric among the plurality of candidate numbers of batches; and performing operations within a artificial neural network accelerator based on the determined batch size in parallel using the internal memory banks; and an output interface that transmits the determined batch size to the artificial neural network accelerator.

6. The apparatus of claim 5, wherein the processor determines a different batch size for each layer of the artificial neural network.

7. The apparatus of claim 6, wherein the processor optimizes a throughput based performance metric for the artificial neural network based on each batch size for each layer and determines a batch size having a maximum value of the throughput based performance metric for each layer as the batch size of the layer.

8. The apparatus of claim 5, wherein the processor buffers input data to match the determined batch size.

9. The apparatus of claim 5, wherein the processor optimizes the throughput based performance metric of the artificial neural network by changing a number of batches associated with the batch size to a total number of internal memory banks of the artificial neural network.

* * * * *